_United States Patent Office_

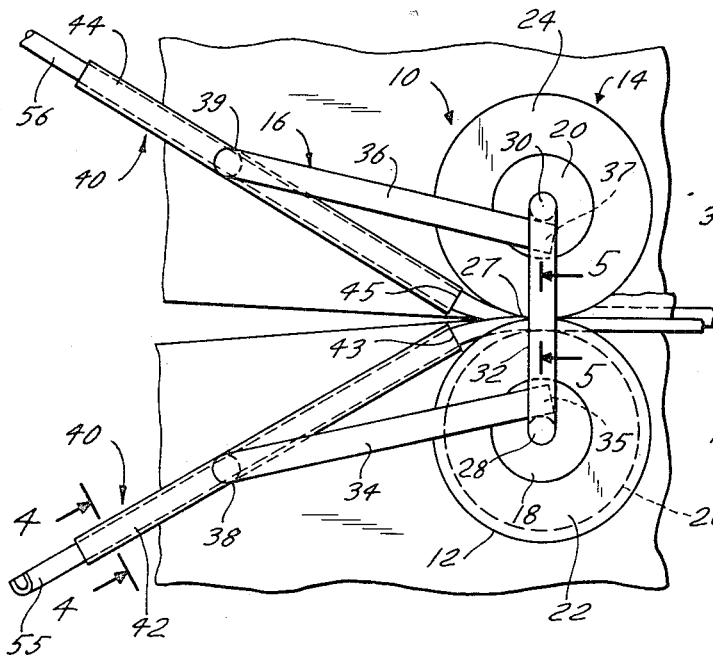
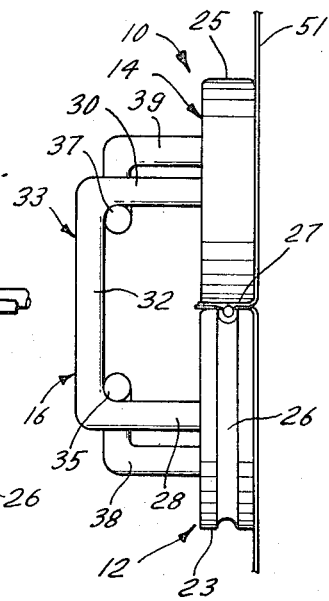
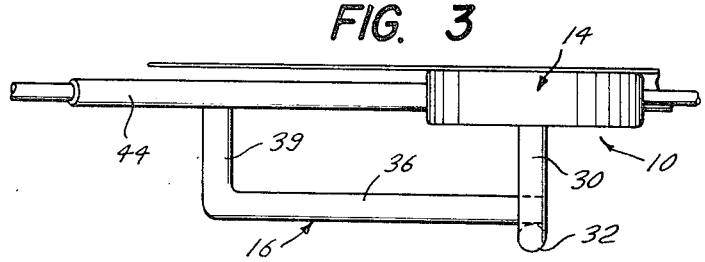
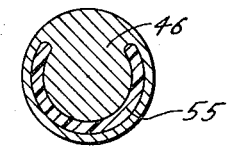
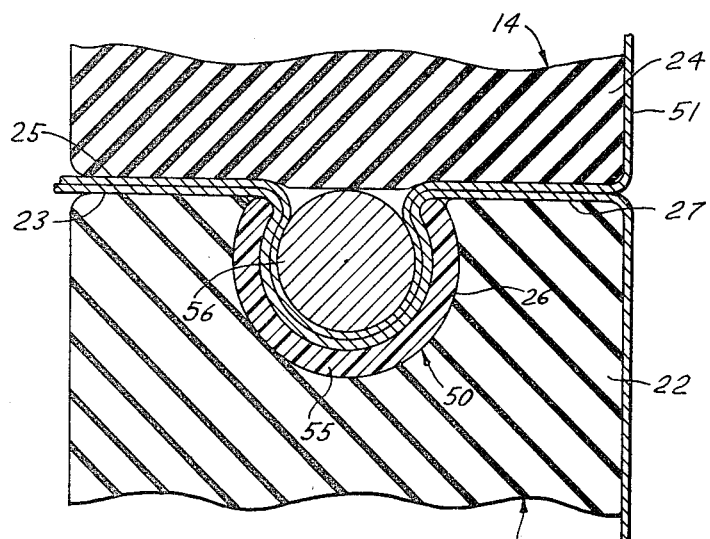
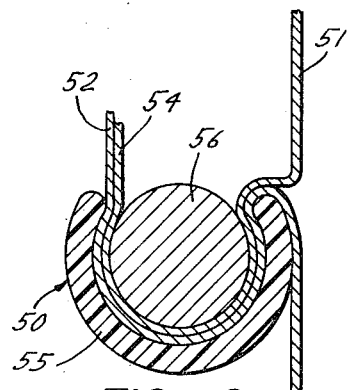

3,546,764
Patented Dec. 15, 1970

3,546,764
DEVICE FOR SEALING THE ENDS OF FLEXIBLE FILM
James Clapp, Hillsdale, N.Y., assignor to Sunny Mead Farms, Inc., Hillsdale, N.Y., a corporation of New York
Filed Mar. 22, 1968, Ser. No. 715,305
Int. Cl. B21d *39/00;* B23p *19/00;* B32b *31/04*
U.S. Cl. 29—200      5 Claims

ABSTRACT OF THE DISCLOSURE

A sealing device for joining the ends of a flexible plastic film and adapted to releasably mount a sealing strip thereto comprising: a frame, an assembly means rotatably mounted to the frame, guide means for guiding the sealing means to the assembly means and a U-shaped member providing a hand-enagaging portion for moving the device so as to cause the assembly means to rotate so that the sealing strip and the plastic film are engaged by the assembly means whereby a continuous substantially air-tight seal is formed.

BACKGROUND OF THE INVENTION

Many devices have been employed for sealing the ends of plastic film to form various types of containers or other articles of a desired configuration. Relatively recently plastic film has been employed for making break-down storage bins or silos. Many different types of apparatus have been developed for sealing the ends of plastic film, such as a heating assembly for welding the ends together or adhesive backed tape. Also, sealing strip assemblies are available which include an elongated member having an annular groove which is adapted to receive an elongated cylindrical member so that the ends of the plastic film may be placed therebetween to form a continuous seal by pressing the members together. The latter sealing means is preferred for break-down storage bins or the like since the seal is readily applied to the ends of the plastic film and is easily removed therefrom when the material in the bin is used.

When applying such a seal several workers are generally required to align the sealing means and ends of the plastic films so that the sealing means may be applied with a minimum of waste of plastic material, thereby maintaining maximum storage capacity. When applying the sealing means and affixing it in place to form a continuous seal care must be taken to insure engagement between the sealing means and the plastic film so that a substantially continuous and airtight seal is formed. This is accomplished by manual labor since no suitable device is available for affixing the sealing means between the ends of the plastic film.

SUMMARY OF THE INVENTION

The improved sealing device of the invention herein generally comprises a sealing device for joining the ends of a flexible plastic film and adapted to releasably mount a sealing strip thereto. The device comprises a frame and assembly means rotatably mounted thereto, guide means for guiding the sealing means to the assembly means and actuating means for rotating the assembly means so that the sealing strip and the plastic film are engaged by the assembly means whereby a continuous, substantially airtight seal is formed.

The device is inexpensive to manufacture, is readily employed by a single operator and is constructed and arranged to simultaneously guide the ends of the plastic film and sealing means to the assembly means so that the sealing means is mounted to the ends of the plastic film to form a continuous seal which is substantially airtight.

DESCRIPTION OF THE DRAWINGS

In the accompanying drawings:
FIG. 1 is a side elevational view of the device with a portion of then ends of a plastic film passing between the assembly wheels with the sealing means engaging the ends of the plastic film;
FIG. 2 is an end elevational view of the device illustrating the manner in which the ends of the plastic film and the sealing means are assembled;
FIG. 3 is a top view of the device of FIG. 1;
FIG. 4 is a sectional view taken along the line 4—4 of FIG. 1;
FIG. 5 is a sectional view taken along the line 5—5 of FIG. 1 illustrating the assembly of the sealing means and plastic film as it passes through the nip of the assembly wheels; and
FIG. 6 is a sectional view of the continuous airtight seal after the plastic film has passed through the assembly wheels as shown in FIG. 5.

Referring now to the drawings and particularly to FIGS. 1–4, the sealing device is generally indicated by the numeral 10. A pair of assembly wheels 12 and 14 are rotatably mounted on rigid frame 16. Wheels 12 and 14 comprise relative rigid hub or rim portions 18 and 20 with a relatively resilient material 22 and 24 formed having an opening therein of a diameter substantially equal to the diameter of the hub for mounting the resilient material thereon to form the wheel. An annular groove 26 is formed in the resilient material 22 of wheel 12 and is radially disposed around the circumference thereof.

The assembly wheels are mounted for rotation on frame 16 employing bearing mounts, not shown, so that axles 28 and 30 are journalled in the bearing mounts for rotation therein. Any other suitable mounting means may be employed to provide relative ease of rotation of the assembly wheels. Axles 28 and 30 are interconnected by tie bar 32. Preferably axles 28 and 30 and tie bar 32 are formed from a unitary piece of cylindrical stock to form a U-shaped member 33 as seen in FIG. 2. The distance between axles 28 and 30 is substantially equal to the sum of the radii of wheels 12 and 14 so that the outer surfaces 23 and 25 of the wheels are in frictional engagement at nip 27 thereby causing the wheels to coact with respect to each other when they are rotated. The hub and resilient material forming the wheels herein may be made of any suitable materials commonly employed in the industry, for example, the hub may be formed of a lightweight metal or a rigid plastic material. The resilient material may be rubber, either natural or synthetic, or any other plastic material such that it will not readily slide or slip when moved against a similar surface. Support members 34 and 36 are conveniently formed in the shape of an L with one leg thereof rigidly mounted to tie bar 32 at 35 and 37 as seen in FIG. 1. Guide means 40 comprise, respectively, tubular members 42 and 44 and are disposed obliquely to nip 27 with the ends 43 and 45 thereof terminating adjacent each other and spaced from the nip 27. Tubular members 42 and 44 are rigidly mounted to frame 16 by support members 34 and 36 at ends 38 and 39 so as to position the guide means in longitudinal alignment with respect to the diameter of the wheels. Tubular member 42 is formed having a mandrel 46 disposed longitudinally therein and extending substantially throughout the length thereof as seen in section in FIG. 4.

FIG. 5 illustrates the assembly of the releasable sealing means 50 and the plastic film 51 as it passes through nip 27 of assembly wheels 12 and 14. FIG. 6 illustrates the releasable sealing means 50 mounted in position so as to engage the ends 52 and 54 of plastic film 51 in a substantially continuous airtight seal. Sealing means or strip 50 is formed of two elongated, coextensive members. One member is in the configuration of a crescent strip 55 so as to fit over mandrel 46 formed in tubular member 42 so that the crescent strip, as it passes through the tubular member, will be guided into annular groove 26 of wheel 23 with its opening adapted to receive cylindrical strip 56 as it passes through tubular member 44 of the guide means 40.

The following description of the operation of my improved sealing device will aid in a better understanding of its use for forming a break-down storage bin or silo. It should be understood, however, that my device may be employed for joining the ends of plastic film for uses other than forming a break-down storage bin.

When a storage bin is to be erected, a relatively large sheet of plastic film made of polyethylene is placed on a flat surface. Silage to be stored is then deposited on the plastic film so that one-half thereof may be lifted over the silage deposited thereon to form a cover with the free ends of the plastic being in substantial face-to-face contact. The sealing device 10 is preferably placed on its side with assembly wheels 12 and 14 in contact with the surface of the plastic film so that its ends are substantially aligned with the nip of the wheels. The sealing means or strip 50 is passed into guide means 40 with the crescent strip 55 mounted on mandrel 46 of tubular member 42 and cylindrical strip 56 passed through tubular member 44, the ends thereof terminating adjacent the nip 27. Crescent strip 55 and cylindrical strip 56 are passed through the assembly wheels prior to forming a seal so that when the sealing device is moved along the ends of the plastic film to be sealed the sealing strip will be in proper position for receiving the ends of the plastic film. Annular groove 26 formed in wheel 23 is formed having a diameter and depth substantially equal to the outer dimensions of crescent strip 55. The sealing device is ready for sealing the ends of the plastic film. To seal the ends all that is required is to lift ends 52 and 54 to a point between the ends 43 and 45 of tubular members 42 and 44 and adjacent nip 27 of the assembly wheels. Then by pulling the sealing device along the ends 52 and 54 of the plastic film the ends will be disposed between cylindrical strip 56 and crescent strip 55 in a press fit as it passes through nip 27 of the assembly wheels. This is seen most clearly in FIG. 5. The device is then pulled along the ends of the plastic film until all of the ends are sealed in a continuous substantially airtight seal. The device is moved by an operator by holding U-shaped member 33 and pulling the device along the ends of the plastic film to be sealed. Thus, the device is readily employed by a single operator and is constructed and arranged to simultaneously guide the ends of the plastic film and sealing means of the assembly means so that the sealing means is mounted to the ends of the plastic film to form a continuous seal which is substantially airtight. It is obvious that various modifications in design and changes in materials may be made without departing from the scope of the invention as defined by the appended claims.

I claim:

1. A sealing device for joining the ends of a flexible plastic film and adapted to releasably mount a sealing strip thereto comprising: a frame, an assembly means rotatably mounted to the frame, guide means for guiding the sealing means to the assembly means and a U-shaped member providing a hand-engaging portion for moving the device so as to cause the assembly means to rotate so that the sealing strip and the plastic film are engaged by the assembly means whereby a continuous substantially air-tight seal is formed.

2. A sealing device for joining the ends of a flexible plastic film and adapted to releasably mount a sealing strip thereto comprising: a frame, an assembly means rotatably mounted to the frame, a pair of tubular members disposed obliquely to the assembly means in spaced relation thereto and mounted to the frame, one of said members having a mandrel formed therein for guiding a portion of the sealing strip therethrough to the assembly means and actuating means for rotating the assembly means so that the sealing strip and the plastic film are engaged by the assembly means whereby a continuous substantially air-tight seal is formed.

3. A sealing device as set forth in claim 1 wherein the assembly means comprises a pair of coacting wheels rotatably mounted on the ends of the U-shaped member, the distance between the ends of the U-shaped member being substantially equal to the sum of the radii of the assembly wheels so that the outer surfaces of the assembly wheels are in frictional engagement forming a nip therebetween.

4. A sealing device as set forth in claim 3 wherein one of said coacting wheels has a radially disposed annular groove formed around the circumference thereof adapted to receive a sealing strip therein.

5. A sealing device for joining the ends of a flexible plastic film and adapted to releasably mount a sealing strip thereto comprising: a frame, a pair of coacting wheels rotatably mounted to the frame, one of the wheels having a radially disposed annular groove formed around the circumference thereof adapted to receive a sealing strip therein, a pair of tubular members disposed obliquely to the assembly wheels in spaced relation thereto and mounted to the frame, one of the members having a mandrel formed therein for guiding a portion of the sealing strip therethrough, said member being disposed in longitudinal alignment with respect to the annular groove formed around the circumference of the assembly wheel whereby the sealing strip is guided from the tubular member into the annular groove in operative position to receive a second portion of the sealing strip from the other tubular member of the guide means and actuating means for moving the device so as to cause the coacting wheels to rotate so that the sealing strip and the plastic film are engaged by the coacting wheels whereby a continuous substantially air-tight seal is formed.

References Cited

UNITED STATES PATENTS 2,825,384  3/1958  Goldsmith _____ 29—505
3,264,724  8/1966  Griesser _____ 29—429

THOMAS H. EAGER, Primary Examiner

U.S. Cl. X.R.

29—429, 505; 156—544